(12) United States Patent
Peng et al.

(10) Patent No.: US 12,483,170 B2
(45) Date of Patent: Nov. 25, 2025

(54) ELECTRIC DRIVE SYSTEM WITH STATIC PULSED POWER TRANSFER

(71) Applicant: GM GLOBAL TECHNOLOGY OPERATIONS LLC, Detroit, MI (US)

(72) Inventors: Peng Peng, Columbus, OH (US); Lei Hao, Troy, MI (US); Suresh Gopalakrishnan, Troy, MI (US); Renato Amorim Torres, Pontiac, MI (US); Dongxu Li, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 155 days.

(21) Appl. No.: 18/582,833

(22) Filed: Feb. 21, 2024

(65) Prior Publication Data

US 2025/0266778 A1    Aug. 21, 2025

(51) Int. Cl.
| | |
|---|---|
| H02P 21/36 | (2016.01) |
| H02J 7/14 | (2006.01) |
| H02P 21/22 | (2016.01) |
| H02P 21/28 | (2016.01) |
| H02P 27/05 | (2006.01) |
| B60L 15/20 | (2006.01) |

(52) U.S. Cl.
CPC ................ *H02P 21/28* (2016.02); *H02J 7/14* (2013.01); *H02P 21/22* (2016.02); *H02P 27/05* (2013.01); *B60L 15/20* (2013.01); *B60L 2210/30* (2013.01); *B60L 2210/40* (2013.01); *H02P 2207/05* (2013.01)

(58) Field of Classification Search
CPC .......... H02P 21/28; H02P 21/22; H02P 27/05; H02P 2207/05; B60L 15/20
See application file for complete search history.

(56) References Cited

U.S. PATENT DOCUMENTS

2020/0119677 A1*   4/2020  Takahashi  ............... H02P 21/36

* cited by examiner

*Primary Examiner* — Muhammad S Islam
(74) *Attorney, Agent, or Firm* — Quinn IP Law

(57) ABSTRACT

An electric drive system includes an electric machine having a stator assembly and a rotor assembly. The stator assembly has a plurality of multi-phase stator windings, including a first stator winding and a second stator winding. A first inverter is adapted to feed the first stator winding. A second inverter is adapted to feed the second stator winding. The rotor assembly includes rotor windings having a single phase. A controller is configured to selectively command excitation of the rotor windings with a pulsed field current such that a direct-axis (d-axis) stator flux linkage is generated. A d-axis stator voltage is induced in the first stator winding and the second stator winding by the d-axis stator flux linkage. Pulsed power transfer is enabled through interaction of the d-axis stator voltage and respective d-axis winding currents in the first stator winding and the second stator winding.

20 Claims, 7 Drawing Sheets

ELECTRIC DRIVE SYSTEM WITH STATIC PULSED POWER TRANSFER

INTRODUCTION

The disclosure relates generally to an electric drive system with an electric machine. More specifically, the disclosure relates to an electric drive system having static pulsed power transfer between two stator windings. An electric machine generally includes a stator having a plurality of stator windings and a rotor rotatable within the stator. In a generator mode, the rotation of the rotor induces voltage in the stator winding, which powers an external load. Alternately, if an electric current is passed through the stator windings, the energized windings cause the rotor to rotate, and the machine will perform as a motor. In a synchronous electric machine, the stator magnetic field and the rotor magnetic field are locked together and rotate at the same speed. Power transfer topologies of electric machines generally employ direct current excitation on the rotor, which may be accomplished for example, with a permanent magnet or a single-phase field winding. Maintaining synchronization between the rotor and stator fields requires that the rotor be spinning during the power transfer. Additionally, a mechanical clutch is needed to decouple the electric machine from the axle during power transfer.

SUMMARY

Disclosed herein is an electric drive system having an electric machine with a stator assembly and a rotor assembly. The stator assembly has a plurality of multi-phase stator windings, including a first stator winding and a second stator winding. A first inverter is adapted to feed the first stator winding. A second inverter is adapted to feed the second stator winding. The rotor assembly includes rotor windings having a single phase. A controller is in communication with the electric machine, the controller having a processor and tangible, non-transitory memory on which instructions are recorded. The controller is configured to selectively command excitation of the rotor windings with a pulsed field current such that a direct-axis (d-axis) stator flux linkage is generated. A d-axis stator voltage is induced in the first stator winding and the second stator winding by the d-axis stator flux linkage. Pulsed power transfer is enabled through interaction of the d-axis stator voltage and respective d-axis winding currents in the first stator winding and the second stator winding.

The controller may be adapted to selectively command excitation of the first stator winding and the second stator winding with alternating d-axis currents at a same frequency as the pulsed field current, to generate the respective d-axis winding currents. The d-axis stator flux linkage is in phase with the pulsed field current, and the d-axis stator voltage is 90 degrees ahead of the d-axis stator flux linkage. The respective d-axis winding currents have a phase angle of zero degrees with the d-axis stator voltage when a positive power is commanded, the phase angle being 180 degrees when a negative power is needed.

The controller may be adapted to adjust a position of the rotor assembly via a closed-loop strategy, including adjusting a position of the rotor assembly, via the controller, including applying a reluctance torque and/or electromagnetic torque to the rotor assembly. The reluctance torque is induced through creation of an error angle in a virtual reference frame of the rotor assembly and the electromagnetic torque is induced through injection of q-axis current components.

In some embodiments, a vehicle battery is selectively electrically coupled with the first stator winding, the battery providing power to the first stator winding during a propulsion mode of the vehicle. An external energy source may be selectively electrically coupled with the second stator winding, the external energy source including at least one of a vehicle-to-load connection, a vehicle-to-house connection, and a vehicle-to grid connection. During a charging mode of the vehicle, the second stator winding is adapted to consume energy from the external energy source, the pulsed power transfer occurs from the second stator winding to the first stator winding, and the first stator winding is adapted to provide power to the vehicle battery.

In some embodiments, a power source is selectively couplable to the electric machine, the power source being adapted to transmit a direct current (DC) signal. A power converter is adapted to receive the DC signal. A high-frequency rotary transformer is electrically coupled to the power converter, the high-frequency rotary transformer having a stationary portion and a rotating portion such that an alternating current (AC) in the stationary portion induces an AC voltage in the rotating portion. A rectifier is adapted to receive the AC voltage from the rotating portion of the high-frequency rotary transformer, the rectifier being adapted to convert the AC voltage to DC voltage. A DC bus is adapted to store the DC voltage from the rectifier. The electric drive system may include an inverter adapted to receive the DC voltage from the DC bus, the DC voltage being converted through into an AC current in the inverter. The rotor windings include a phase coil adapted to receive the AC current from the inverter for generation of a rotor field.

In some embodiments, a power source is selectively couplable to the electric machine, the power source being adapted to transmit a DC signal. A DC-to-AC inverter adapted to receive the DC signal for conversion to an AC current. The electric drive system may include a slip ring device adapted to receive the AC current from the DC-to-AC inverter, the electric machine having a stationary side and a rotating side. The slip ring device is positioned such that the AC current flows from the stationary side to the rotating side, the single-phase rotor windings being adapted to receive the AC current for generation of a rotor field. Operation of the vehicle is controlled based in part on the power generated.

Disclosed herein is a method of pulsed power transfer in an electric drive system in a vehicle, the electric drive system having a controller with a processor and tangible, non-transitory memory, and an electric machine with a stator assembly and a rotor assembly. The method includes incorporating a plurality of multi-phase stator windings in the stator assembly, including a first stator winding and a second stator winding, the rotor assembly including rotor windings having a single phase. The method includes adapting a first inverter to feed the first stator winding and adapting a second inverter to feed the second stator winding. The method includes commanding selectively excitation of the rotor windings with a pulsed field current, via the controller, such that a direct-axis (d-axis) stator flux linkage is generated, a d-axis stator voltage being induced in the first stator winding and the second stator winding by the d-axis stator flux linkage. Pulsed power transfer is enabled through interaction of the d-axis stator voltage and respective d-axis winding currents in the first stator winding and the second stator winding.

Disclosed herein is a vehicle having an electric machine with a stator assembly and a rotor assembly, the stator assembly having a plurality of multi-phase stator windings, including a first stator winding and a second stator winding, the rotor assembly including rotor windings having a single phase. A controller is in communication with the electric machine, the controller having a processor and tangible, non-transitory memory on which instructions are recorded. The controller is configured to selectively command excitation of the rotor windings with a pulsed field current such that a direct-axis (d-axis) stator flux linkage is generated. A d-axis stator voltage is induced in the first stator winding and the second stator winding by the d-axis stator flux linkage. Pulsed power transfer is enabled through interaction of the d-axis stator voltage and respective d-axis winding currents in the first stator winding and the second stator winding.

The above features and advantages and other features and advantages of the present disclosure are readily apparent from the following detailed description of the best modes for carrying out the disclosure when taken in connection with the accompanying drawings.

Figure 1:
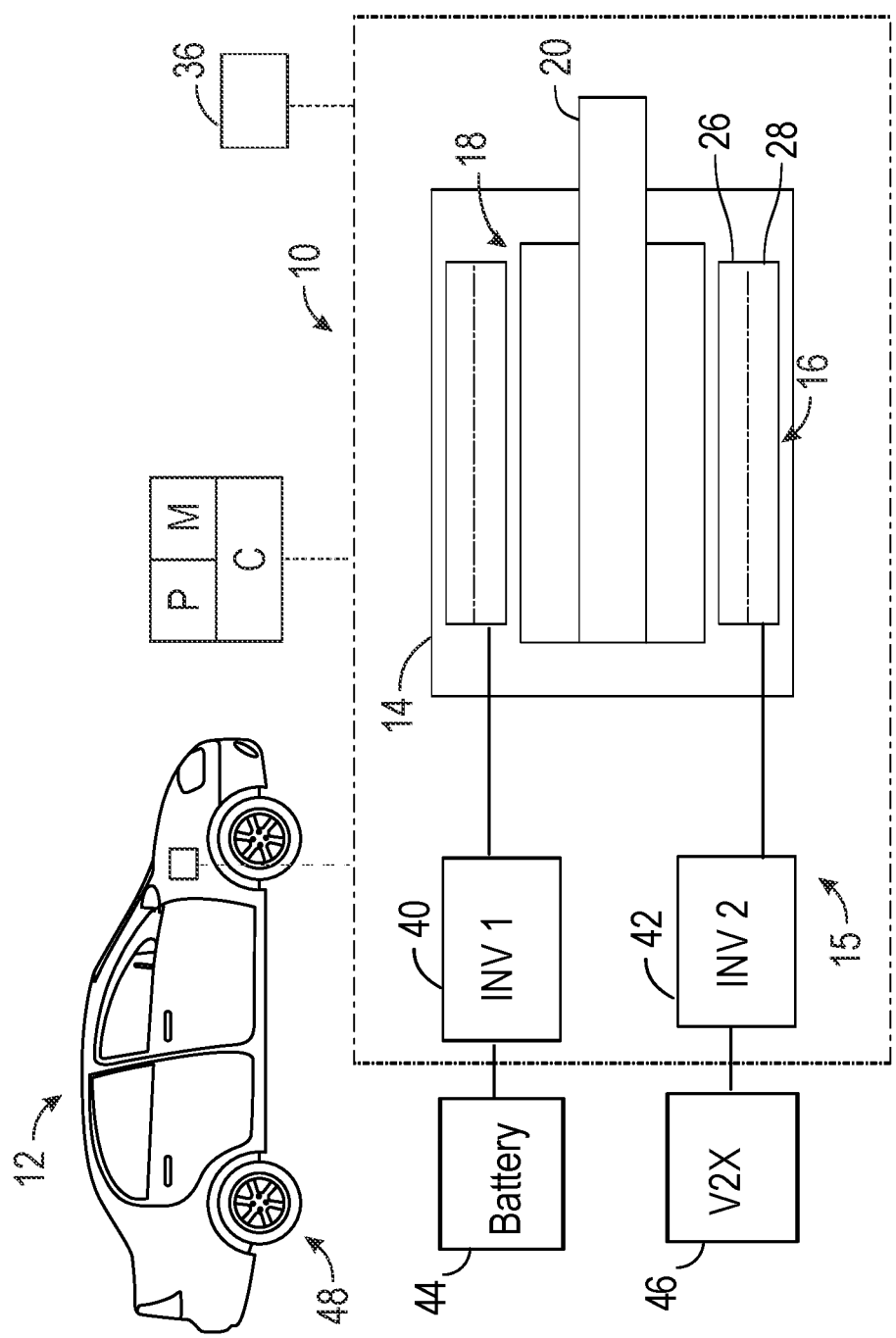
FIG. 1 is a schematic fragmentary block diagram of electric drive system having an electric machine and a controller.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Referring to the drawings, wherein like reference numbers refer to like components, FIG. 1 is a schematic fragmentary diagram of an electric drive system 10, which may be part of a vehicle 12. The vehicle 12 may be a mobile platform, such as, but not limited to, a passenger car, sport utility vehicle, light truck, heavy duty vehicle, ATV, minivan, bus, transit vehicle, bicycle, robot, farm implement, sports-related equipment, boat, plane, train or other device. The vehicle 12 may be partially or fully electric. The vehicle 12 may take many different forms and include multiple and/or alternate components and facilities.

The electric drive system 10 includes an electric motor/generator, referred to herein as electric machine 14, configured to generate torque and a plurality of power converters 15. Referring to FIG. 1, the electric machine 14 includes a stator assembly 16 positioned at least partially around a rotor assembly 18 having a rotor shaft 20. The electric machine 14 is a wound rotor machine.

Figure 2:
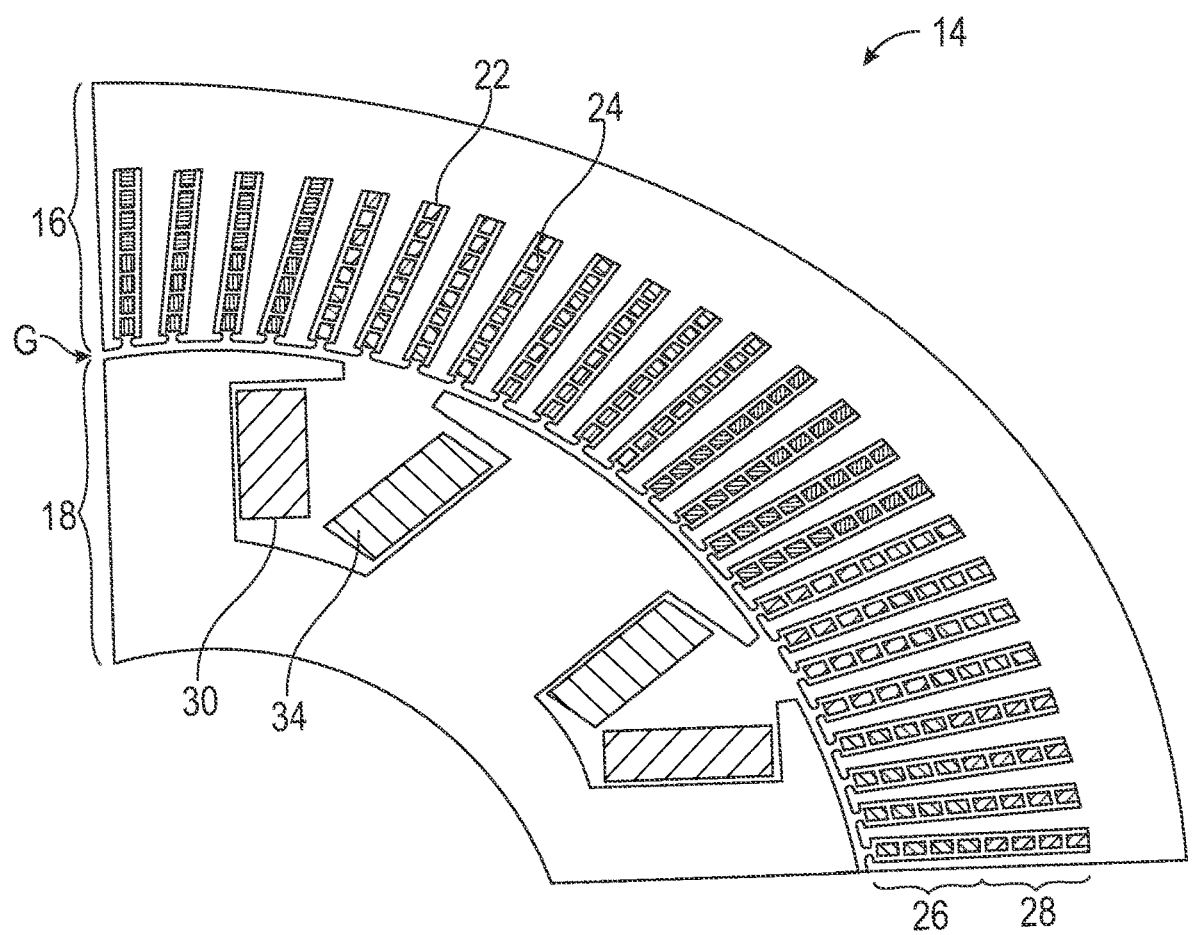
FIG. 2 is a schematic fragmentary sectional view through the electric machine of FIG. 1.

FIG. 2 is a schematic fragmentary sectional view through the electric machine 14. Referring to FIG. 2, the stator assembly 16 is spaced from the rotor assembly 18 by an air gap G. Referring to FIG. 2, the stator assembly 16 has respective conductors 22 extending through stator slots 24 and arranged in sets of windings. The stator assembly 16 has two multi-phase stator windings, including a first stator winding 26 and a second stator winding 28, shown in FIGS. 1-2. In other words, the stator assembly 16 has two winding sets, with each winding set having at least three phases. Referring to FIG. 2, the electric machine 14 has a rotor assembly 18, which may be a salient-pole rotor assembly 18. The rotor assembly 18 includes rotor poles 30 having conductive wires wound around them, forming single-phase rotor windings 34.

Motor-based power transfer strategies using synchronous electric machines generally require spinning of the rotor in order to synchronize the rotor field with the stator field. During power transfer, a mechanical clutch is needed to decouple the electric machine from the axle of the vehicle. As described below, the electric drive system 10 enables a bi-directional pulsed power transfer technique, without requiring that the rotor spin. The electric machine 14 is capable of rotor magnetic flux control using current flow in the single-phase rotor windings 34. Additionally, the electric drive system 10 removes the need for a mechanical clutch.

Referring to FIG. 1, the electric drive system 10 includes a controller C having a processor P and tangible, non-transitory memory M (or computer readable storage medium) on which instructions are recorded for a method 50 of controlling operation of the electric drive system 10 based on torque demand. Method 50 is shown in and described below with reference to FIG. 3. Two embodiments of the electric drive system 10 are shown in and described below with respect to FIGS. 4-5.

The electric machine 14 operates as a transformer, such that an alternating current ("AC") excitation in the rotor windings 34 induces an AC voltage in the first and second stator windings 26, 28. With appropriate current control in the first and second stator windings 26, 28, a bi-directional power flow occurs between the two stator windings, enabling static pulsed power transfer applications. Static power transfer here refers to power transfer that does not require spinning of the rotor assembly 18. In other words, the electric machine 14 is operated as a static transformer with its stator windings 26, 28 and rotor windings 34 respectively considered as the primary and secondary windings in a transformer. The current, voltage, resistance, inductance on the rotor side may be referred to the stator side using a turn ratio ($N_s/N_f$).

Referring to FIGS. 1-2, the two sets of segmented multiphase windings in the stator assembly 16 are fed by separate inverters for independent current control. Referring to FIG. 1, the first stator winding 26 and the second stator winding 28 are fed by a first inverter 40 and a second inverter 42, respectively. The first stator winding 26 and the second stator winding 28 are galvanically isolated. The first stator winding 26 and the second stator winding 28 may be respectively electrically coupled with a power converter at the onboard energy storage system (e.g., a vehicle battery 44), and a power converter at an external energy source 46 (or power grid 46) during the power transfer. The external energy source 46 may be a vehicle-to-load connection (V2L), a vehicle-to-house (V2H) connection, or a vehicle-to-grid (V2G) connection.

Referring to FIG. 1, the vehicle battery 44 provides power to the first stator winding 26 during a propulsion mode of the vehicle 12. During a charging mode, the first stator winding 26 (on the battery side) provides power to the battery 44. During the charging mode, the second stator winding 28 (on the grid side) consumes power from the power grid 46; the power transfers from the grid-side stator winding (second stator winding 28 in FIG. 1) to the battery-side stator winding (first stator winding 26 in FIG. 1). Referring to FIG. 1, the production of torque by the electric drive system 10 is subsequently transmitted to the wheels 48 of the vehicle 12.

Figure 3:
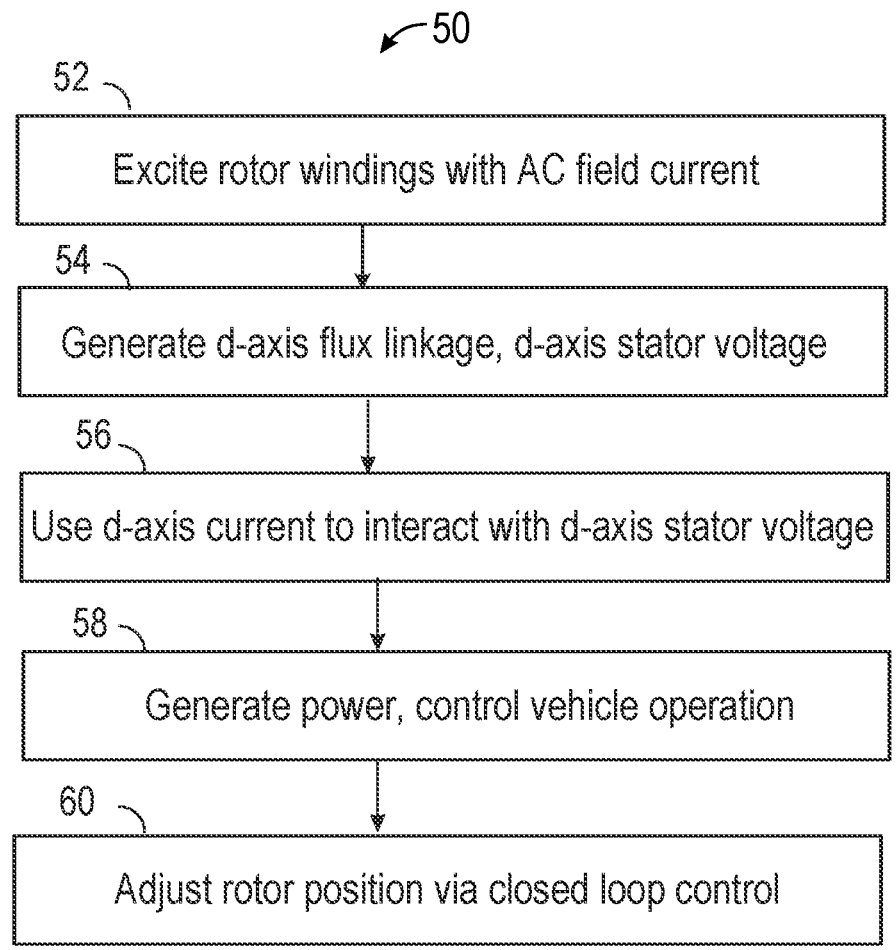
FIG. 3 is a schematic flowchart for a method executable by the controller of FIG. 1.

Referring now to FIG. 3, a flow chart of method 50 executable by the controller C of FIG. 1 is shown. Method 50 need not be applied in the specific order recited herein and some blocks may be omitted. The memory M can store controller-executable instruction sets, and the processor P can execute the controller-executable instruction sets stored in the memory M.

Figure 6:
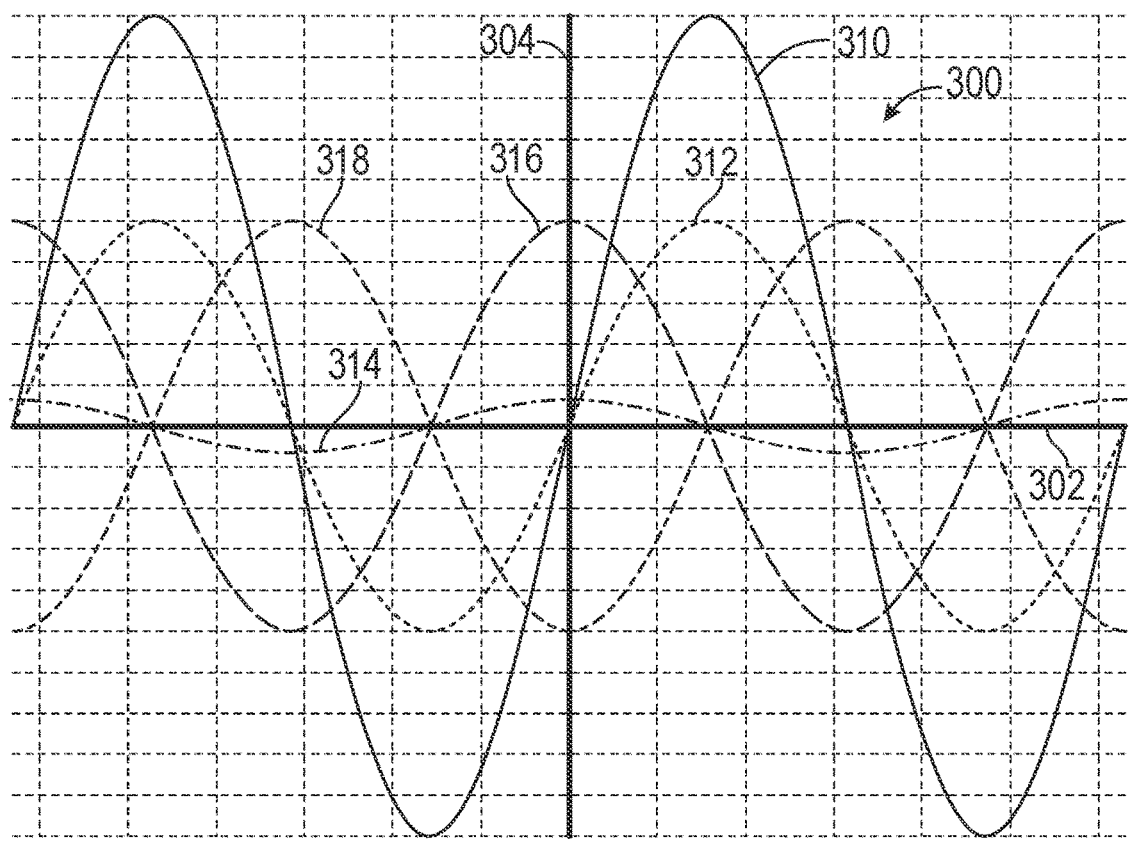
FIG. 6 is a schematic graph illustrating various motor parameters over time.

Per block 52 of FIG. 3, the method 50 includes exciting the rotor windings 34 with an alternating current, $i_{field}$ (e.g., sinusoidal, sawtooth), shown as pulsed field current 310 in FIG. 6. FIG. 6 is a schematic graph of various motor parameters 300, with the horizontal axis 302 depicting time, and the vertical axis 304 depicting amplitude. As understood by those skilled in the art, in geometric terms, the direct axis (d-axis) and quadrature axis (q-axis) are single-phase representations of the flux contribution of separate sinusoidal phase quantities occurring at the same angular velocity. The d-axis in particular is aligned/in-phase with the magnetic field (north pole) of the rotor assembly 18. The d-axis and q-axis commands in motor control may be employed as adjustable setpoints (or control handles) accessible to the controller C when controlling flux and torque settings of the electric machine 14. The d-axis current may be manipulated using d-axis voltage commands for the purpose of generating flux.

Per block 54 of FIG. 3, the single-phase rotor windings 34 function as an "exciter," creates an alternating d-axis stator flux linkage 312 ($\lambda_d$), in the first and second stator windings 26, 28. The d-axis stator flux linkage 312 (see FIG. 6) is in phase with the pulsed field current 310. An alternating d-axis stator voltage 314 (v_d) is induced in the first and second stator windings 26, 28 due to the d-axis stator flux linkage 312. The d-axis stator voltage 314 is 90-degree ahead of the d-axis stator flux linkage 312 because induced voltage is the derivative of the flux linkage.

Per block 56 of FIG. 3, the controller C is configured to selectively command excitation of the first stator winding 26 and the second stator winding 28 with alternating d-axis currents (e.g., sinusoidal, sawtooth, etc.) at the same frequency as the pulsed field current 310, to generate respective d-axis winding currents 316, 318 in the first and second stator windings 26, 28. The respective d-axis winding currents 316, 318 interact with the d-axis stator voltage 314 to generate power. In other words, power is generated by the electric machine 14 through interaction of the induced d-axis stator voltage 314 (see FIG. 6) and the respective d-axis winding currents 316, 318 in the first and second stator windings 26, 28. Active power and unity power factor may be achieved if the d-axis stator voltage 314 and the respective d-axis winding currents 316, 318 are in phase. The active power generated may be expressed as:

$$\text{Active Power} = \frac{3}{2}[[(v_d * i_d) + (v_q * i_q)].$$

Depending on the direction of the power flow, the respective d-axis winding currents may be in phase with (zero-degree phase angle) with the d-axis stator voltage 314 when a positive power is needed, or out of phase (180-degree phase angle) with the d-axis stator voltage 314 when a negative power is needed.

The first and second stator windings 26, 28 consume and deliver power respectively, i.e., bi-directional power. The respective d-axis winding currents 316, 318 may define the same magnitude but opposite polarity such that the respective flux linkages due to the stator winding currents cancel out and the d-axis stator flux linkage 312 depends simply on the pulsed field current 310. The reactive power (wasted) generated is approximately zero.

The electric drive system 10 may employ different current waveforms in both the first and second stator windings 26, 28 and rotor windings 34 (harmonic injection) to increase the robustness of current controls, minimize vibration, and improve power transfer. The number of turns of the rotor windings 34 is selected such that it is compatible with the DC voltage, desired level of power, fundamental frequency during power transfer, and meets the requirement of field winding magnetomotive force, as well as the field winding current rating during a propulsion mode of the vehicle 12.

The electric drive system 10 may be controlled such that the torque ripple during the static power transfer is lower than a predefined threshold, to improve the life of other components, such as the gear unit 36 in FIG. 1. In one example, the predefined threshold may be set to be between about 1 and 2 Nm (Newton-meters). Additionally, the rotor assembly 18 may be moved to a middle portion of the gear lash (e.g., ±15 degrees) with proper inverter control before power transfer to enable clearance for possible vibration of the rotor assembly 18.

Figure 7:
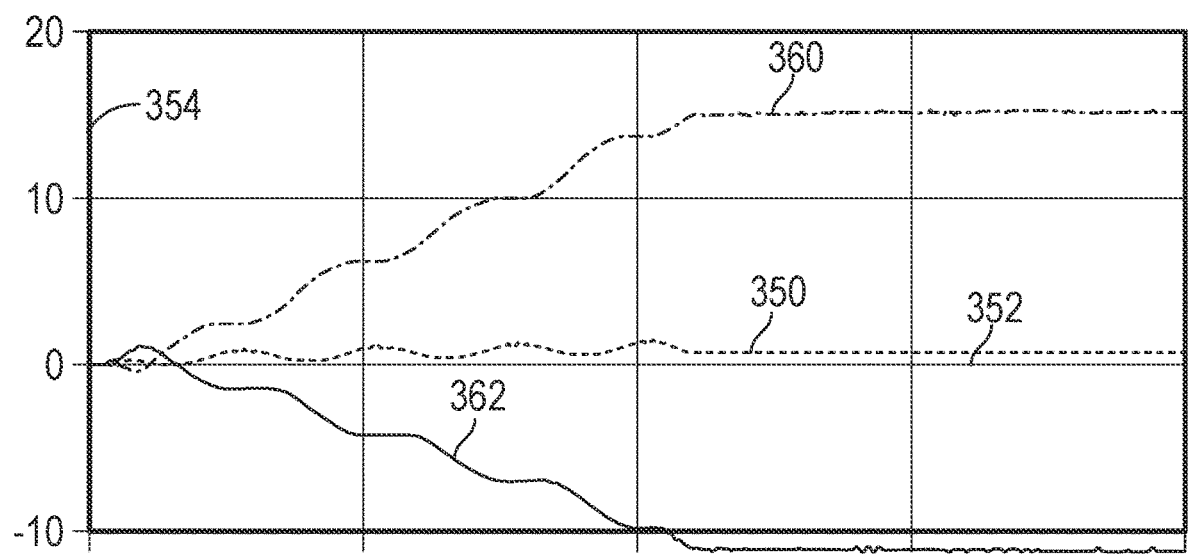
FIG. 7 is a schematic graph illustrating active power generated by the electric machine over time.

Per block 58 of FIG. 3, the method 50 includes controlling vehicle operation via the active power generated in the electric drive system 10. The torque demand of the vehicle 12 is modulated through the electric drive system 10. FIG. 7 is a schematic graph with the horizontal axis 352 depicting time, and the vertical axis 354 depicting power (kW). Trace 350 shows the active power generated by the electric machine 14. Referring to FIG. 7, trace 360 illustrates the positive power 360 (consuming power from the external energy source 46). Trace 362 illustrates the negative power 362 (delivering power to the vehicle battery 44) generated.

Figure 8:
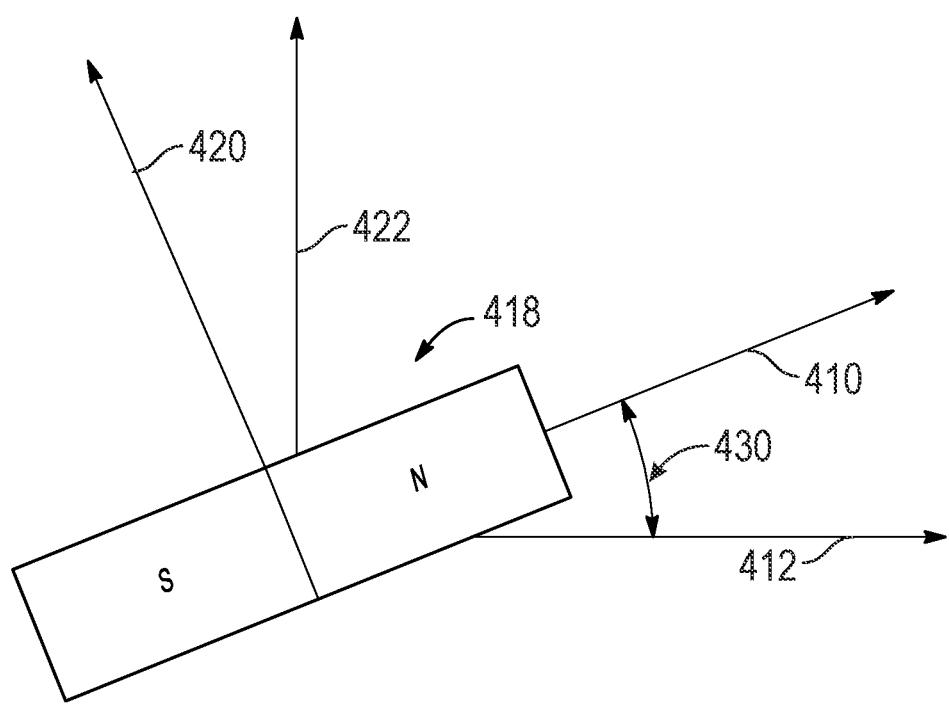
FIG. 8 is a simplified illustration of a rotor assembly within the electric drive system of FIG. 1.

Per block 60 of FIG. 3, the controller C may be adapted to adjust the rotor position, via a closed-loop strategy, to ensure no major rotor movement during the static pulsed power transfer. Referring to FIG. 8, a simplified schematic illustrating a rotor assembly 418 as an electromagnet. The electromagnet 418 defines a south pole(S) and north pole (N). While magnetic torque components will average to zero when injecting the alternating stator flux linkage in accordance with the method 50 above, there may be a non-zero component of reluctance torque with the alternating stator flux linkage.

The controller C may employ this reluctance torque in a controlled manner to maintain a desired angular position of the rotor assembly 418. The amplitude of the d-axis current commands used as part of the method 50 may also be slowly increased to allow closed-loop position control of the rotor assembly 418 to react in the event of minor torque generation. This closed-loop strategy may be accomplished in a rotating or stationary reference frame, either using αβ or ABC voltage signals, as understood by those skilled in the art. Due to slot harmonics, some rotor positions may be more immune to torque ripple than others during injection of the alternating stator flux linkage. The rotor assembly 18 of FIG. 1, for instance, may be selectively positioned to predetermined optimized angular positions on key-off of the vehicle 12. The following equation for determining the torque (T) may be employed in using a reluctance torque for controlling position of the rotor assembly 418:

$$T = \frac{3P}{2}[L_f i_{field} i_q] + [[L]_d - L_q) i_d i_q].$$

Here P is the number of poles of the electric machine 14, $i_f$, $i_g$ and $i_d$ are the field, q-axis and d-axis currents $L_f$, $L_q$ and $L_d$ are the field, q-axis and d-axis inductances of the electric machine 14.

Here, the component $(L_f i_{field} i_q)$ reduces to zero, as the average of the q-axis current $(i_q)$ is zero when injecting field current 310. However, in some embodiments the controller C may command injection of a component on the q-axis to influence the torque via the $[[L]_f i_{field} i_q)$ term. The q-axis and d-axis currents may be expressed as follows: $i_d^e = i_d^{\hat{e}} \cdot \cos(\theta_{err}) + i_q^{\hat{e}} \cdot \sin(\theta_{err})$; and $i_q^e = i_d^{\hat{e}} \cdot -\sin(\theta_{err}) + i_q^{\hat{e}} \cdot \cos(\theta_{err})$. In the above equations, error angle 430 ($\theta_{err}$) is the angle difference between the real dq-axis reference frame, which is aligned with the north pole N of the rotor assembly 418 and a virtual reference frame.

Referring to FIG. 8, axis 410 ($i\_d^e$) and axis 420 ($i_q^e$) are the respective d-axis and q-axis current components on the real reference frame. Axis 412 ($i\_d^{\hat{e}}$) and axis 422 ($i_q^{\hat{e}}$) are the respective d-axis and q-axis current components on the virtual reference frame of the controller C. These expressions, when multiplied together (assuming $i\_q^{\hat{e}} = 0$), are expressed as: $i_d^e i_q^e = -i_d^{\hat{e}2} \sin(\theta_{err})$;

$$T \approx -\frac{3P}{2} i_d^{\hat{e}2} (L_d - L_q) \sin(\theta_{err}).$$

Again, P is the number of poles of the electric machine 14, $L_d$ and $L_q$ are the d- and q-axis inductances of the electric machine 14.

Thus, referring to FIG. 8, by creating a small error angle 430 ($\theta_{err}$) in the virtual reference frame, it is possible to induce a small average amount of reluctance torque. This induced reluctance torque is then applied to the rotor assembly 18 to maintain a desired angular position of the rotor assembly 18. Control loops may be added around the methods of torque generation discussed above. Here, the controlled variable is the rotor position, and the control knobs are the q-axis current or the angle error. Various types of regulators available to those skilled in the art may be employed, such as for example, a proportional-integral (PI) control module, a proportional-integral-derivative (PID) control module, or a lead-lag compensator.

Figure 4:
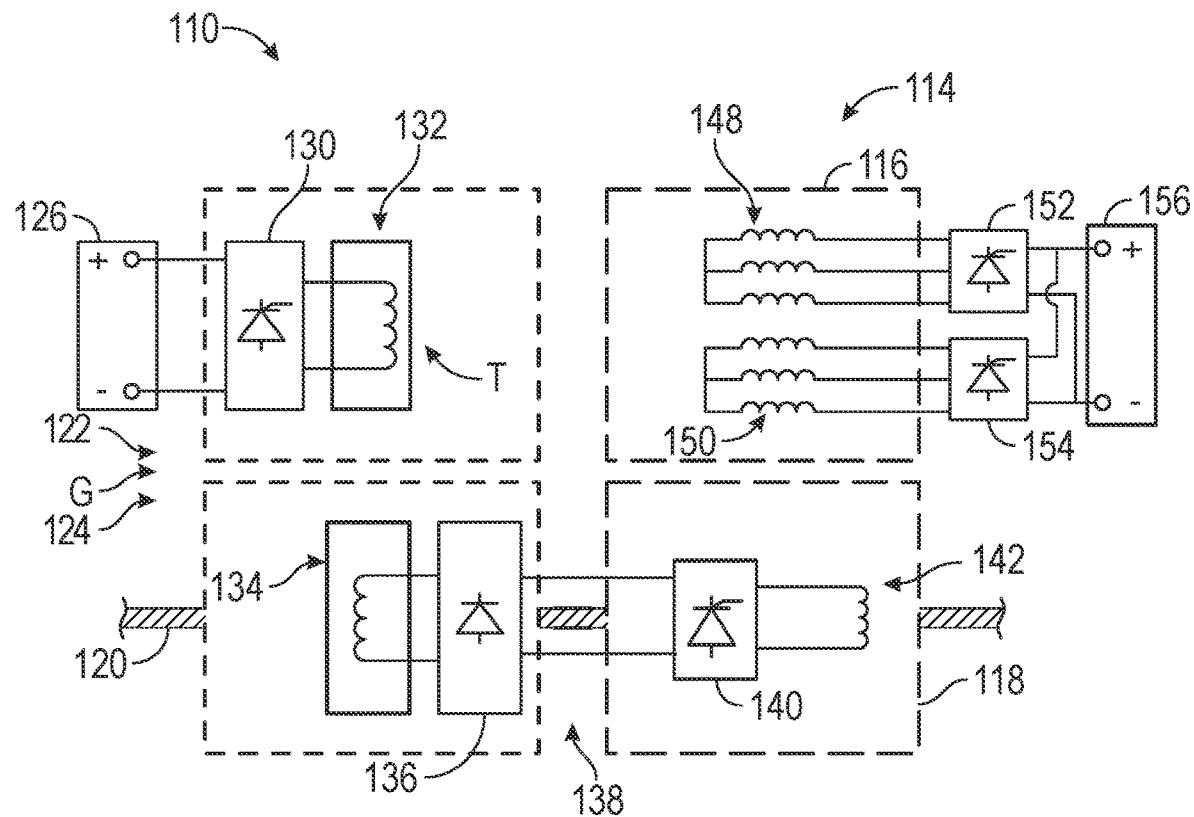
FIG. 4 is a schematic fragmentary diagram of the electric drive system of FIG. 1, in accordance with a first embodiment.

Referring now to FIG. 4, an electric drive system 110 in accordance with a first embodiment is shown. The electric drive system 110 includes an electric machine 114 with a stator assembly 116, and a rotor assembly 118 having a rotor shaft 120. The electric drive system 110 has a rotating side 122 and a stationary side 124, separated by an air gap G.

Referring to FIG. 4, a power source 126 (e.g., a high voltage battery) is selectively couplable to the electric drive system 110 and adapted to transmit a direct current (DC) signal to a power converter, such as DC-to-AC inverter 130. The DC-to-AC inverter 130 converts the DC signal to an AC signal, for transmission to a stationary portion 132 of a rotary transformer T. The rotary transformer T is adapted to couple electrical signals between two parts that rotate relative to one another and may be a high-frequency rotary transformer. In one embodiment, the high-frequency rotary transformer has a working frequency exceeding about 10 kilo Hertz. The AC excitation in the stationary portion 132 induces voltage in a rotating portion 134 of the rotary transformer T, which is connected to a rectifier 136. The rectifier 136 converts the AC voltage and builds up DC voltage in a DC bus 138.

Referring to FIG. 4, the DC voltage from the DC bus 138 is converted through the inverter 140 into AC current and supplied to a phase coil 142 in the rotor assembly 118, resulting in the creation of a rotor field. The rotor field interacts with the stator field in the first and second stator windings 148, 150. Referring to FIG. 4, the first and second stator windings 148, 150 are fed by first and second inverters 152, 154 powered by an energy source 156. Interaction of the rotor field with the stator field results in the production of torque, subsequently transmitted to the wheels 48 of the vehicle 12. The example shown in FIG. 4 incorporates single wireless power transfer across the air gap G.

Figure 5:
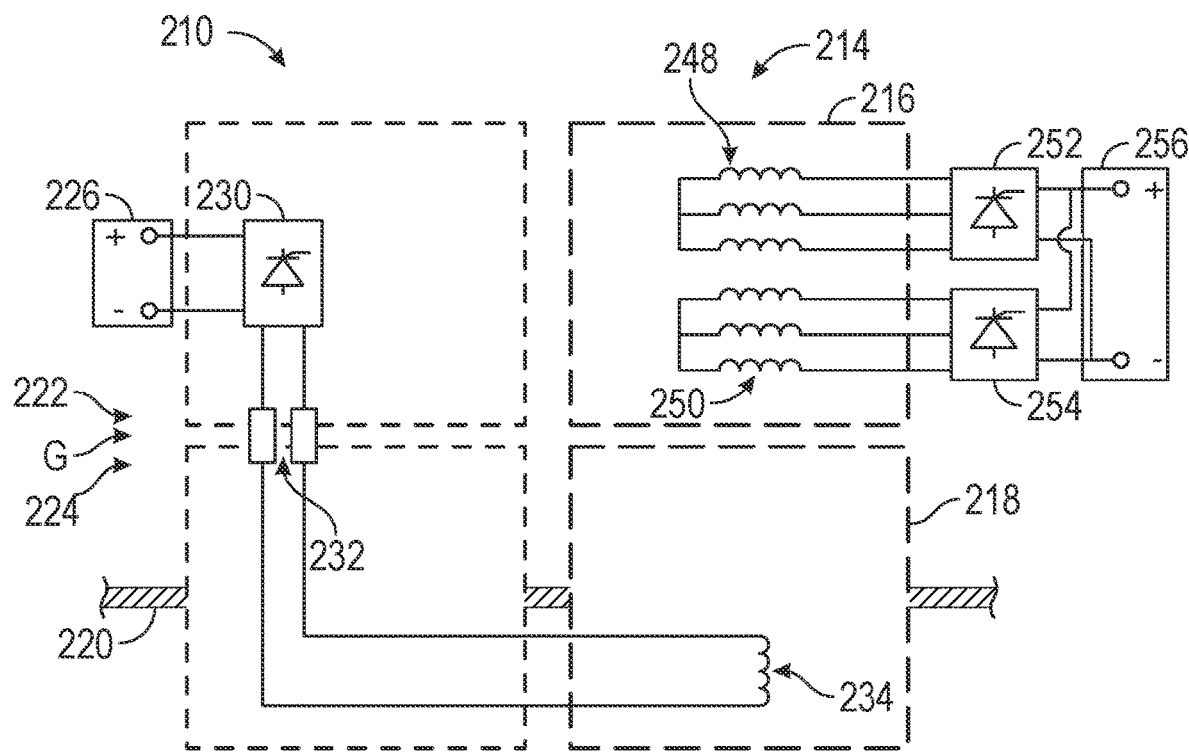
FIG. 5 is a schematic fragmentary diagram of the electric drive system of FIG. 1, in accordance with a second embodiment.

Referring now to FIG. 5, an electric drive system 210 in accordance with a second embodiment is shown. The electric drive system 210 includes an electric machine 214 with a stator assembly 216, and a rotor assembly 218 having a rotor shaft 220. The electric drive system 210 has a rotating side 222 and a stationary side 224, separated by an air gap G.

Referring to FIG. 5, a power source 226 (e.g., a high voltage battery) is selectively couplable to the electric drive system 210 and adapted to transmit a DC signal to an inverter 230, which converts it to an AC signal. The AC signal flows from the stationary side 224 to the rotating side 222 through mechanical contact power transfer in the form of a slip ring device 232, which supplies the AC signal to a phase coil 234 in the rotor assembly 218. The slip ring device 232 is employed to transmit power or electrical signals between a stationary component and a rotating component and may also be referred to as a rotary electrical joint, electric swivel, and collector ring. The slip ring device 232 may include one or more rotating rings and stationary brushes. The configuration of the slip ring device 232 may be varied based on the application.

The AC excitation in the phase coil 234 results in the creation of a rotor field which interacts with the stator field in the first and second stator windings 248, 250. Referring to FIG. 5, the first and second stator windings 248, 250 are fed by first and second inverters 252, 254 powered by an energy source 256. Interaction of the rotor field with the stator field results in the production of torque, subsequently transmitted to the wheels 48 of the vehicle 12.

In summary, the electric drive system 10 enables bi-directional, pulsed power transfer to and from the vehicle 12. The electric machine 14 may be a wound field synchronous machine with single-phase rotor windings 34 and dual-three-phase stator windings. The rotor windings 34 are excited with a single-phase pulsed field current 310 which induces an alternating d-axis stator flux linkage 312 in the first and second stator windings 26, 28. The d-axis stator flux linkage 312 is in phase with the field current 310. The d-axis stator flux linkage 312 induces an alternating d-axis stator voltage 314 in the first and second stator windings 26, 28, which is 90-degree ahead of the d-axis stator flux linkage 312. During the power transfer mode, the rotor speed is kept at approximately 0 rpm. The inductance of the single-phase rotor winding 34 may limit the maximum frequency during charging. A relatively low turn number and low inductance of the rotor windings 34 may be employed for optimal power level and efficiency.

The controller C of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a set of files in a file storage system, an application database in a proprietary format, a relational database management system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description, are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. An electric drive system for a vehicle, comprising:
an electric machine having a stator assembly and a rotor assembly, the stator assembly having a plurality of multi-phase stator windings, including a first stator winding and a second stator winding, the rotor assembly including rotor windings having a single phase;
a first inverter adapted to feed the first stator winding;
a second inverter adapted to feed the second stator winding;
a controller in communication with the electric machine, the controller having a processor and tangible, non-transitory memory on which instructions are recorded static for a method of pulsed power transfer;
wherein the controller is configured to selectively command excitation of the rotor windings with a pulsed field current such that a direct-axis (d-axis) stator flux linkage is generated, a d-axis stator voltage being induced in the first stator winding and the second stator winding by the d-axis stator flux linkage; and
wherein the pulsed power transfer is enabled through interaction of the d-axis stator voltage and respective d-axis winding currents in the first stator winding and the second stator winding.

2. The electric drive system of claim 1, wherein the controller is adapted to selectively command excitation of the first stator winding and the second stator winding with alternating d-axis currents at a same frequency as the pulsed field current, to generate the respective d-axis winding currents.

3. The electric drive system of claim 1, wherein the d-axis stator flux linkage is in phase with the pulsed field current, and the d-axis stator voltage is 90 degrees ahead of the d-axis stator flux linkage.

4. The electric drive system of claim 1, wherein the controller is adapted to adjust a position of the rotor assembly via a closed-loop strategy, including applying a reluctance torque and/or electromagnetic torque to the rotor assembly, the reluctance torque being induced through creation of an error angle in a virtual reference frame of the rotor assembly and the electromagnetic torque being induced through injection of q-axis current components.

5. The electric drive system of claim 1, wherein the respective d-axis winding currents have a phase angle of zero degrees with the d-axis stator voltage when a positive power is commanded, the phase angle being 180 degrees when a negative power is needed.

6. The electric drive system of claim 1, further comprising:
   a vehicle battery selectively electrically coupled with the first stator winding, the battery providing power to the first stator winding during a propulsion mode of the vehicle;
   an external energy source selectively electrically coupled with the second stator winding, the external energy source including at least one of a vehicle-to-load connection, a vehicle-to-house connection, and a vehicle-to grid connection; and
   wherein during a charging mode of the vehicle, the second stator winding is adapted to consume energy from the external energy source, the pulsed power transfer occurs from the second stator winding to the first stator winding, and the first stator winding is adapted to provide power to the vehicle battery.

7. The electric drive system of claim 1, further comprising:
   a power source selectively couplable to the electric machine, the power source being adapted to transmit a direct current (DC) signal;
   a power converter adapted to receive the DC signal;
   a high-frequency rotary transformer electrically coupled to the power converter, the high-frequency rotary transformer having a stationary portion and a rotating portion such that an alternating current (AC) in the stationary portion induces an AC voltage in the rotating portion;
   a rectifier adapted to receive the AC voltage from the rotating portion of the high-frequency rotary transformer, the rectifier being adapted to convert the AC voltage to DC voltage; and
   a DC bus adapted to store the DC voltage from the rectifier.

8. The electric drive system of claim 7, further comprising:
   an inverter adapted to receive the DC voltage from the DC bus, the DC voltage being converted through into an AC current in the inverter; and
   wherein the rotor windings include a phase coil adapted to receive the AC current from the inverter for generation of a rotor field.

9. The electric drive system of claim 1, further comprising:
   a power source selectively couplable to the electric machine, the power source being adapted to transmit a DC signal;
   a DC-to-AC inverter adapted to receive the DC signal for conversion to an AC current;
   a slip ring device adapted to receive the AC current from the DC-to-AC inverter, the electric machine having a stationary side and a rotating side; and
   wherein the slip ring device is positioned such that the AC current flows from the stationary side to the rotating side, the single-phase rotor windings being adapted to receive the AC current for generation of a rotor field.

10. The electric drive system of claim 1, wherein operation of the vehicle is controlled based in part on the power generated.

11. A method of pulsed power transfer in an electric drive system in a vehicle, the electric drive system having a controller with a processor and tangible, non-transitory memory, and an electric machine with a stator assembly and a rotor assembly, the method comprising:
   incorporating a plurality of multi-phase stator windings in the stator assembly, including a first stator winding and a second stator winding, the rotor assembly including rotor windings having a single phase;
   adapting a first inverter to feed the first stator winding;
   adapting a second inverter to feed the second stator winding;
   commanding selectively excitation of the rotor windings with a pulsed field current, via the controller, such that a direct-axis (d-axis) stator flux linkage is generated, a d-axis stator voltage being induced in the first stator winding and the second stator winding by the d-axis stator flux linkage; and
   enabling pulsed power transfer through interaction of the d-axis stator voltage and respective d-axis winding currents in the first stator winding and the second stator winding.

12. The method of claim 11, further comprising:
   commanding excitation of the first stator winding and the second stator winding with the respective d-axis winding currents at a same frequency as the pulsed field current, via the controller, to generate the respective d-axis winding currents.

13. The method of claim 11, further comprising:
   configuring the electric machine such that the d-axis stator flux linkage is in phase with the pulsed field current, and the d-axis stator voltage is 90 degrees ahead of the d-axis stator flux linkage.

14. The method of claim 11, further comprising:
   adjusting a position of the rotor assembly, via the controller, including applying a reluctance torque and/or electromagnetic torque to the rotor assembly, the reluctance torque being induced through creation of an error angle in a virtual reference frame of the rotor assembly and the electromagnetic torque being induced through injection of q-axis current components.

15. The method of claim 11, further comprising:
   configuring the electric machine such that the respective d-axis winding currents have a phase angle of zero degrees with the d-axis stator voltage when a positive power is commanded, the phase angle being 180 degrees when a negative power is needed.

16. The method of claim 11, further comprising:
   coupling electrically a vehicle battery with the first stator winding, the battery providing power to the first stator winding during a propulsion mode of the vehicle;
   coupling electrically an external energy source with the second stator winding, the external energy source including at least one of a vehicle-to-load connection, a vehicle-to-house connection, and a vehicle-to grid connection; and
   adapting the second stator winding to consume energy from the external energy source during a charging mode of the vehicle, and adapting the first stator winding to provide power to the vehicle battery, the pulsed power transfer occurring from the second stator winding to the first stator winding.

17. A vehicle comprising:
   an electric machine having a stator assembly and a rotor assembly, the stator assembly having a plurality of multi-phase stator windings, including a first stator winding and a second stator winding, the rotor assembly including rotor windings having a single phase;
   a first inverter adapted to feed the first stator winding;
   a second inverter adapted to feed the second stator winding;
   a controller in communication with the electric machine, the controller having a processor and tangible, non-transitory memory on which instructions are recorded for a method of pulsed power transfer;

wherein the controller is configured to selectively command excitation of the rotor windings with a pulsed field current such that a direct-axis (d-axis) stator flux linkage is generated, a d-axis stator voltage being induced in the first stator winding and the second stator winding by the d-axis stator flux linkage;

wherein the controller is configured to selectively command excitation of the first stator winding and the second stator winding with alternating d-axis currents at a same frequency as the pulsed field current, to generate the respective d-axis winding currents;

wherein the d-axis stator flux linkage is in phase with the pulsed field current, and the d-axis stator voltage is 90 degrees ahead of the d-axis stator flux linkage; and wherein the pulsed power transfer is enabled through interaction of the d-axis stator voltage and respective d-axis winding currents in the first stator winding and the second stator winding.

18. The vehicle of claim 17, further comprising:

a vehicle battery selectively electrically coupled with the first stator winding, the battery providing power to the first stator winding during a propulsion mode of the vehicle;

an external energy source selectively electrically coupled with the second stator winding, the external energy source including at least one of a vehicle-to-load connection, a vehicle-to-house connection, and a vehicle-to grid connection; and wherein during a charging mode of the vehicle, the second stator winding is adapted to consume energy from the external energy source, the pulsed power transfer occurs from the second stator winding to the first stator winding, and the first stator winding is adapted to provide power to the vehicle battery.

19. The vehicle of claim 18, further comprising:

a power source selectively couplable to the electric machine, the power source being adapted to transmit a direct current (DC) signal;

a power converter adapted to receive the DC signal;

a high-frequency rotary transformer electrically coupled to the power converter, the high-frequency rotary transformer having a stationary portion and a rotating portion such that an alternating current (AC) in the stationary portion induces an AC voltage in the rotating portion;

a rectifier adapted to receive the AC voltage from the rotating portion of the high-frequency rotary transformer, the rectifier being adapted to convert the AC voltage to DC voltage; and a DC bus adapted to store the DC voltage from the rectifier.

20. The vehicle of claim 19, further comprising:

an inverter adapted to receive the DC voltage from the DC bus, the DC voltage being converted through into an AC current in the inverter; and wherein the rotor windings include a phase coil adapted to receive the AC current from the inverter for generation of a rotor field.

\* \* \* \* \*